United States Patent [19]
Carter et al.

[11] 3,798,563
[45] Mar. 19, 1974

[54] ELECTRON BEAM DIODE POWER DEVICE

[75] Inventors: John L. Carter, Ocean; Joseph W. McGowan, Spring Lake Heights, both of N.J.

[73] Assignee: The United States of America as represented by the Secretary of the Army, Washington, D.C.

[22] Filed: Dec. 12, 1972

[21] Appl. No.: 314,301

[52] U.S. Cl. .......................... 330/44, 330/43, 330/53, 313/338
[51] Int. Cl. .......................... H03f 3/54
[58] Field of Search .................. 330/43, 44; 313/338

[56] References Cited

UNITED STATES PATENTS

| | | | |
|---|---|---|---|
| 2,730,708 | 1/1956 | McNaney | 313/338 X |
| 3,192,431 | 6/1965 | Fryklund | 313/338 X |
| 3,631,315 | 12/1971 | Osepchuk | 330/43 X |

*Primary Examiner*—Nathan Kaufman
*Attorney, Agent, or Firm*—Edward J. Kelly; Herbert Berl; Daniel D. Sharp

[57] ABSTRACT

An electron beam semiconductor amplifier tube having a plurality of spaced groups of serially connected back-biased semiconductor diodes mounted near the periphery of a radial waveguide transmission line. Each group of diodes is bombarded by a corresponding distinct electron beam emanating from one of several angularly spaced emissive regions of a cathode disposed at the center of the radial transmission line. The several groups of diodes are arranged in parallel. A radial wave generated by the current induced in the several diodes by the corresponding impinging electron beam propagates toward the center of the radial transmission line and, thence, to a load of typical impedance. The radial wave can be transformed into a TEM wave and propagated along a coaxial line having the center conductor thereof mounted along the central axis of the tube — which axis passes through the cathode and the center of the radial transmission line.

11 Claims, 4 Drawing Figures

ELECTRON BEAM DIODE POWER DEVICE

SUMMARY OF THE INVENTION

This invention involves an electron beam semiconductor amplifier tube in which an electron beam produces ionization of certain solid state devices. One such device is a shallow pn junction diode which, in the absence of electron bombardment, has the usual large conduction for small forward biasing voltages and small conduction for reverse voltages below the avalanche breakdown voltage. When such a diode is reverse biased, the depletion region of the pn or np junction will extend throughout the semiconductor, thereby establishing a high-field drift region — essential for rapid collection of injected carriers — without large standing currents in the device. Such a semiconductor device essentially comprises a semiconductor body having opposed major surfaces coated with thin metallic contact films. A very shallow p-n or n-p junction is formed beanth one of the metal contact films.

If carriers are injected into such a solid state device, as by bombarding one of the metal contacts with an accelerated electron beam having an energy of the order of 10 KeV, some of the electrons from the beam penetrate the metal contact and enter the semiconductor with considerable energy, part of which excites valence band electrons into the conduction band to create electron-hole pairs. Owing to the very shallow p-n or n-p junction, the hole-electron pairs are created in the semiconductor target in a region of high electric field, so that these carrier parts are rapidly separated and the possibility of recombination is quite low. For this reason, one electronic charge will flow through an external circuit for each electron-hole pair created. The current gain for such a device, defined as the ratio of the semiconductor target current and the electron beam current, is equal to the number of carrier pairs created per beam electron entering the semiconductor with electron bombardment energy $W_b$.

For a semiconductor target of silicon with an aluminum contact layer 1000A ($10^{-7}$ meters) thick, it has been found that the current gain G is given approximately by $$G = W_b - 2\ \text{KeV}/3.6\text{eV}$$

wherein the KeV term in the numerator represents the approximate energy loss in penetrating the metallic contact layer and the 3.6eV term in the denominator represents the energy dissipated in creating each of the electron-hole pairs and is somewhat material-dependent. For a beam with energy of 10KeV, the current gain is approximately 2200.

It has been shown that the maximized output power $P_{omax}$, in watts, of the electron beam-bombarded semiconductor diode is approximated by the following expression $$P_{omax} = 2160\ [(\delta/10^7)\ (r/11.5)\ A]^{6/7}\ 50/z_L$$

where $\delta_o$ is the charge carrier drift velocity expressed in $10^7$cm/sec, $r/11.5$ is the dielectric constant of the semiconductor material (silicon), A is the area of the base of the semiconductor target diode bombarded by the electron beam in square millimeters and $Z_L$ is the load impedance in ohms. The expression indicates that for a given semiconductor material, the area should be increased and the load impedance reduced, in order to increase current and power. Material and fabrication problems impose a limitation on the area of a semiconductor target device. Moreover, the minimum transmission line impedance is restricted by dimension tolerances and by the characteristic impedance of the driven load (antenna, etc.).

This invention discloses a technique for eliminating both of these restrictions by providing means for increasing the total semiconductor target area and by permitting the semiconductor target to look into a relatively small impedance.

The device of the invention includes a plurality of diode assemblies, each comprising several semiconductor target diodes connected in series, so that the area of the semiconductor target impinged upon by the high energy electrons is effectively increased. A separate, radially-directed electron beam is made to impinge upon each of the diode assemblies. A diode assembly having n diodes will have an impedance $nZ_d$, where $Z_d$ is the impedance of each diode. These semiconductor target diodes are mounted near the periphery of a radial waveguide transmission line at a region of relatively low impedance. The characteristic impedance of this radial transmission line is given by the expression $$Z_o = \sqrt{\mu b/\epsilon r}$$

where $\mu$ is the permeability of the material filling the line, $\epsilon$ is the dielectric constant, $r$ is the radius of the transmission line and $b$ is the dimension of the radial line normal to the radial dimension. The impedance of the radial line can readily be fabricated with a desired value of impedance — by proper choice of either or both of the dimensions $b$ and $r$. The impedance of the radial transmission line in the region of the semiconductor target diodes is designed to match the impedance of each of the diode assemblies.

The current induced in each diode by the electron beam generates a radial wave that propagates to the center of the radial transmission line, and there is transformed to a TEM wave which can be made to propagate along a centrally mounted coaxial transmission line to the external load at any convenient impedance, such as 50 ohms. By gradually increasing the dimension b as the center of the radial transmission line is approached, it is possible to provide a suitable impedance transformation between the low impedance diodes and the coaxial line. The coaxial line itself may undergo dimensional changes to achieve impedance transformation between the diodes and the load.

Figures 1, 2:
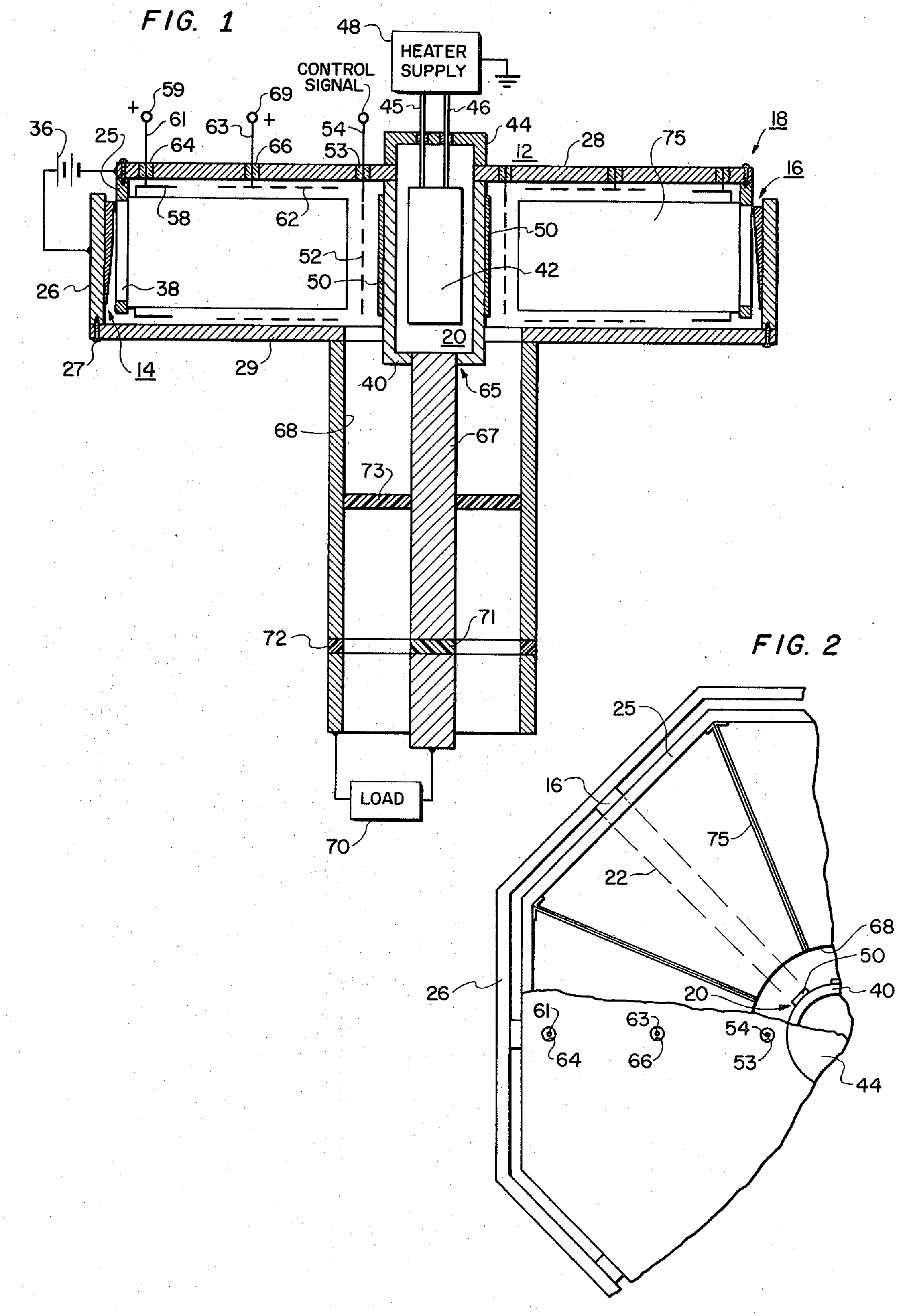
FIG. 1 is a view in cross section showing an amplifying device according to the invention.
FIG. 2 is a partial plan view showing details of the device of FIG. 1.

Referring to the drawing, the electron device 12 comprises a radial transmission line-semiconductor target diode assembly 14 including several diode assemblies 16 arranged about the periphery of a radial waveguide transmission line 18. The device 12 further comprises means including a cathode-heater subassembly 20 for generating a discrete radial electron beam 22 (shown in FIG. 2 and 3) for each of said diode assemblies 16, and means for directing said discrete electron beams toward the corresponding disk assembly 16.

Figure 3:
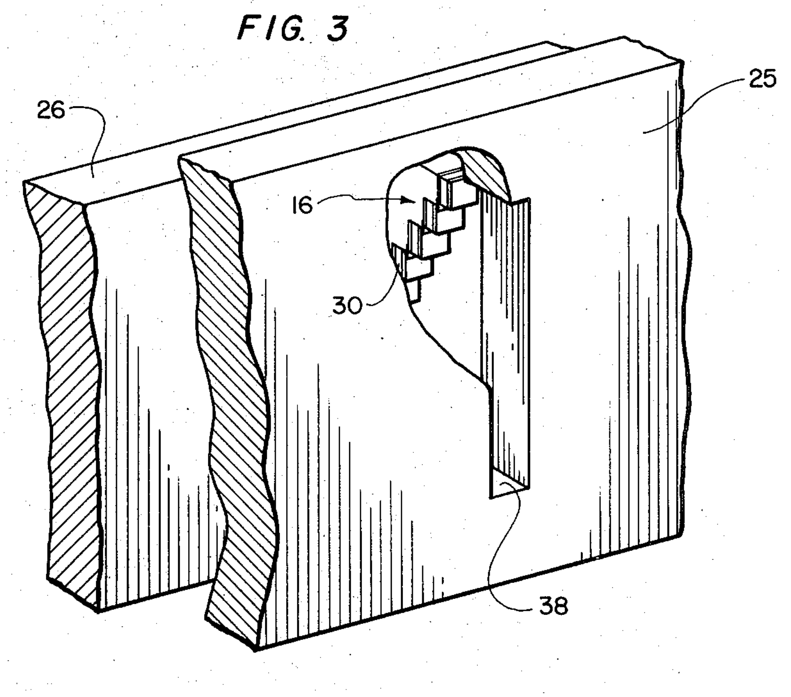
FIG. 3 is a view illustrating further details of the device of FIGS. 1 and 2.

The radial waveguide transmission line 18 includes a pair of spaced peripheral members 25 and 26 to which are attached to respective corresponding top and bottom plates 28 and 29, as by screws 27. The members 25 and 26, which are electrically isolated from one another, are indicated in FIGS. 2 and 3, as having a polygonal configuration. The invention, however, is not limited to such configuration; for example, the members 25 and 26 may be circular members connected with the cathode-heater subassembly 20.

Figure 4:
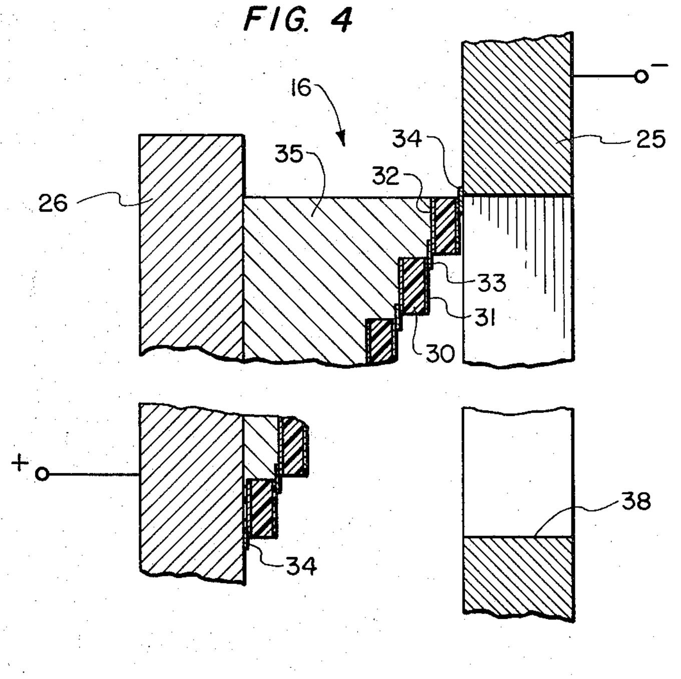
FIG. 4 is a section view of the semiconductor target diode assembly.

Mounted at spaced intervals about the periphery of the radial transmission line 18 between the several diode assemblies 16; the details of construction of these diode assemblies are shown in FIG. 4. If a polygonal construction is used, the diode package 16 is centered along each of the juxtaposed sides of members 25 and 26. Each diode assembly 16 comprises several individual semiconductor target diodes 30 connected in series. As shown in FIG. 4, each diode 30 includes a p-n junction sandwiched between thin film electrodes 31 and 32. Interconnection of the diodes 30 is accomplished by connecting leads 33 attached to the thin film electrodes. The uppermost and lowermost diodes 30 are connected, respectively, to the electrically conductive members 25 and 26 by suitable connecting leads 34. The individual diodes 30 are mounted in a substrate 35 which is slightly stepped so as to minimize the length of the leads interconnecting the separate diodes. The semiconductor target diodes 30 are reverse biased by means of a unidirectional supply 36. As shown in FIG. 3, slots 38 are cut in the members 25 in the vicinity of each diode assembly 16 to expose the diodes thereof to the corresponding electron beam 22.

The cathode-heater assembly 20 includes a cathode support member 40 which can be hermetically sealed to the upper plate 28 of radial transmission line 18. The support member 40 also serves as a portion of the inner conductor of the coaxial line 65 which is mounted at the center of the radial transmission line 18.

A heater 42 is supported inside the cathode support member 40 by means of an electrically insulating header 44 hermetically sealed to the upper plate 28; the heater support rods 45 and 46 which pass through the header 44 also serve as heater leads, which can be connected to an appropriate heater supply 48. Several discrete electron beam sources are provided by depositing any suitable electron emissive material 50 at appropriate intervals around the cathode support member 40. A modulating grid structure 52 adjacent to and surrounding the coated cathode support member 40 provides means for modulating the electron beam emanating from the deposits of cathode material 50. The grid structure 52 can be supported from the upper plate 28 by the grid lead 54 which extends through electrically insulating seals 53, made, for example, of a suitable ceramic or glass. An imput control signal, which can be a periodic rf voltage, can be connected to the modulating grid 52 by way of grid lead 54.

The electron beam is accelerated to a relatively high velocity by means of the cylindrical anode structure 58 which is maintained highly positive relative to the cathode and grid by means of a positive potential applied to the anode structure 58 by way of terminal 59. The connecting lead 61 which passes through the electrically insulating seal 64 serves also as a support member for the anode structure 58.

It is possible to use the plate 25 as an anode by applying a relatively high positive voltage directly to the plate 25, although at a sacrifice of safety; with this arrangement, the anode structure 58 can be omitted. A load 70 is connected between the inner conductor 40, 67 and the outer conductor 68 of coaxial line assembly 65. In order to insulate *rf* currents from the dc supply 36, conventional dielectric elements 71 and 72 may be inserted within the inner and outer conductors 67 and 68. The electron beams from the various cathode emissive surfaces 50 are suitably restrained by means of a focusing electrode structure 62 which is supported from the upper plate 28 by a member 63 passing through electrically insulating seal 66 and connected to a terminal 69 maintained at a positive potential intermediate that of the grid 52 and anode 58.

A microwave window 73 allows for the necessary evacuation of the electron device 12. The coaxial line assembly 65 is disposed at the center of the radial transmission line 18 and includes an inner conductor having an enlarged portion 40 (which also constitutes the cathode support). The coaxial line assembly 65 can include two or more stepped transitions in cross-section in order to achieve a transformation of impedance. In FIG. 1, one such transition is shown from the portion 40 to the portion 67 which can be a solid or hollow member of smaller diameter than that of portion 40. The outer conductor 68 of the centrally disposed coaxial transmission line is attached to the lower plate 29 of the radial transmission line 18.

The current induced in each of diodes 30 owing to impingement by the electron beams 22 from the corresponding individual cathode deposits 50 generates a radial electromagnetic wave which propagates toward the center of the radial transmission line 18. The direction of the electric field will be more or less normal to the plates 28 and 29. The current path is from one terminal of bias supply 36 through the upper plate 28, coaxial line inner conductor 40, 67, load 70, the diodes 30, the lower plate 29 and then by way of the outer conductor 68 back to the source 36. The impedance of these diodes 30 is quite low, being of the order of 2 ohms and a typical diode package 16 contains ten such diodes in series, for a total impedance of about 20 ohms. The combined diode impedance for each diode package 16 should be substantially equal to the impedance of the radial transmission line 18 in the region at which the diodes are mounted. Since the impedance of radial line 18 is directly proportional to the dimension normal to the radial direction of propagation, the space between the plates 28 and 29 can be designed to provide the necessary impedance near the periphery of the radial line 18. Since the output or load impedance of the diode commonly is about 50 ohms — which impedance also is typical of commercially available coaxial lines — some means is required for transforming the impedance in the region of the diodes to a somewhat higher load impedance. At the junction of the radial line 18 and the coaxial line 65, the electric field rotates in space, until it becomes normal to the longitudinal axis of the coaxial line. At this junction, the impedance of the radial line should match that of the coaxial line at this junction, which, for example, may be of the order of 20 ohms. Since the impedance of each diode package 16 is about 20 ohms, no transformation of impedance normally would be necessary. However, if such transformation of impedance is derived, the impedance can be increased by gradually increasing the spacing between the plates 28 and 29 of the radial line 18 in the direction of the center of the line.

Radial members 75 of electrically resistive material are interposed between adjacent diode arrays to provide resistive coupling therebetween diodes, and prevent oscillations in undesired modes. The radial resistive segments, which resistively load all undesired modes of resonance, must be disposed in a radial direction so as to be parallel to the direction of propagation of the radial waves of the desired purely radial mode, in which mode the diodes 30 are excited in phase synchronism by the electron beam 22.

What is claimed is:

1. A solid state amplifying electron device for supplying wave energy to a load comprising a radial waveguide transmission means, electron beam generating means including a cathode assembly centrally disposed within said transmission means for producing a plurality of angularly spaced discrete electron beams, a like plurality of diode assemblies each consisting of several semiconductor diodes connected in series, said diodes having an impedance low compared with that of said load, said diode assemblies being disposed at a region of said radial waveguide transmission means of impedance substantially equal to that of each of said diode assemblies, means for reverse biasing each of said diode assemblies, means for radially directing each of said discrete electron beams onto a corresponding one of said diode assemblies in response to a control input signal, each of said diodes each having an electrode formed on a major surface thereof which is pervious to said beam electrons and having a depletion region adjacent said electrode which is accessible to beam electrons impinging upon said diode, each of said diodes having a current induced therein when bombarded by said electron beam which generates a radial wave propagating toward the center of said radial transmission means.

2. A solid state amplifying electron device according to claim 1 wherein said region of said radial transmission line is adjacent the periphery thereof.

3. A solid state electron device according to claim 1 further including a coaxial line disposed within said transmission means and coaxial with said transmission means and with said diodes.

4. A solid state electron device according to claim 2 further including a coaxial line disposed within said transmission means and coaxial with said transmission means and with said diodes.

5. A solid state amplifying electron device according to claim 3 wherein said coaxial line includes an inner conductor having at least a portion thereof forming part of said cathode assembly.

6. A solid state amplifying electron device according to claim 4 wherein said coaxial line includes an inner conductor having at least a portion thereof forming part of said cathode assembly.

7. A solid state electron device according to claim 2 wherein said coaxial line has an inner conductor the dimensions of which decreases progressively in the direction of wave propagation.

8. A solid state electron device according to claim 6 wherein said coaxial line has an inner conductor the dimensions of which decreases progressively in the direction of wave propagation.

9. A solid state amplifying electron device according to claim 5 wherein said cathode assembly includes a plurality of angularly spaced electron-emissive deposits mounted on the periphery of said inner conductor.

10. A solid state amplifying electron device according to claim 6 wherein said cathode assembly includes a plurality of angularly spaced electron-emissive deposits mounted on the periphery of said inner conductor.

11. A solid state electron device according to claim 10 further including radial resistive loading elements disposed between adjacent diodes for preventing operation in modes other than the desired radial mode.

* * * * *